(12) United States Patent
Terada et al.

(10) Patent No.: US 9,194,440 B2
(45) Date of Patent: Nov. 24, 2015

(54) PRODUCTION METHOD FOR CONED DISC SPRING AND CLUTCH APPARATUS PROVIDED WITH CONED DISC SPRING

(71) Applicant: NHK SPRING CO., LTD.

(72) Inventors: Yusuke Terada, Aikoh-gun (JP); Shuji Ando, Aikoh-gun (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 14/141,269

(22) Filed: Dec. 26, 2013

(65) Prior Publication Data

US 2014/0138205 A1 May 22, 2014

Related U.S. Application Data

(62) Division of application No. 12/450,527, filed as application No. PCT/JP2008/056569 on Apr. 2, 2008.

(30) Foreign Application Priority Data

Apr. 3, 2007 (JP) .................................. 2007-097125

(51) Int. Cl.
*F16D 13/58* (2006.01)
*B21D 28/06* (2006.01)
(Continued)

(52) U.S. Cl.
CPC .............. *F16D 13/583* (2013.01); *B21D 28/06* (2013.01); *B21D 53/16* (2013.01); *B23D 31/02* (2013.01);
(Continued)

(58) Field of Classification Search
CPC ........ B23D 31/02; B21D 53/16; B21D 28/06; F16D 13/583; F16D 25/12; F16D 25/0638; F16F 1/32; Y10T 29/49609; Y10T 29/49611
See application file for complete search history.

(56) References Cited

U.S. PATENT DOCUMENTS

| 3,868,099 A | 2/1975 | Maucher et al. |
| 4,276,947 A | 7/1981 | Hebel |

(Continued)

FOREIGN PATENT DOCUMENTS

| EP | 1 582 767 A2 | 10/2005 |
| FR | 2154258 | 5/1973 |

(Continued)

OTHER PUBLICATIONS

Human Translation of Masaki (JP 55034567U), Mar. 5, 1980.*

(Continued)

*Primary Examiner* — Ryan J Walters
(74) *Attorney, Agent, or Firm* — Oliff PLC

(57) ABSTRACT

A clutch apparatus is equipped with two clutch structures having a clutch drum therein. A driven plate and a piston are provided in the clutch drum of each clutch structure, and a primary coned disc spring and a secondary coned disc spring, which are ring-shaped, are provided between the driven plate and the piston. A flat portion is formed on an inner peripheral portion of a convex surface of the primary coned disc spring, and the flat portion can come into contact with a counter member first when a load is applied. A load in a flat condition due to elastic deformation is adjusted by the flat portion so as to be a desirable value. Blanks and of the primary coned disc spring and the secondary coned disc spring can be obtained from one sheet of material having the same thickness. In this case, the flat portion is formed by press forming on an inner peripheral portion of the blank in view of the shape thereof after bending forming is performed.

1 Claim, 7 Drawing Sheets

(51) Int. Cl.
*B21D 53/16* (2006.01)
*F16D 25/0638* (2006.01)
*F16D 25/12* (2006.01)
*F16F 1/32* (2006.01)
*B23D 31/02* (2006.01)

(52) U.S. Cl.
CPC ............ *F16D 25/0638* (2013.01); *F16D 25/12* (2013.01); *F16F 1/32* (2013.01); *Y10T 29/49609* (2015.01); *Y10T 29/49611* (2015.01)

(56) References Cited

U.S. PATENT DOCUMENTS

| | | | | |
|---|---|---|---|---|
| 4,623,055 | A | * | 11/1986 | Ohkubo ............... 192/85.34 |
| 4,989,696 | A | | 2/1991 | Buell |
| 5,857,666 | A | | 1/1999 | Zhi-Peng et al. |
| 6,308,397 | B1 | | 10/2001 | Nishimura et al. |
| 8,091,873 | B2 | | 1/2012 | Ogawa et al. |
| 8,109,374 | B2 | | 2/2012 | Ando |
| 2005/0217964 | A1 | | 10/2005 | Asahina et al. |
| 2009/0008209 | A1 | | 1/2009 | Ando |

FOREIGN PATENT DOCUMENTS

| | | |
|---|---|---|
| JP | A-48-041146 | 6/1973 |
| JP | U-55-34567 | 3/1980 |
| JP | A-58-132326 | 8/1983 |
| JP | U-59-10548 | 1/1984 |
| JP | A-02-008523 | 1/1990 |
| JP | A-6-106277 | 4/1994 |
| JP | A-07-060374 | 3/1995 |
| JP | A-09-032918 | 2/1997 |
| JP | A-2001-295860 | 10/2001 |
| JP | A-2007-075888 | 3/2007 |
| WO | WO 2007/111222 A1 | 10/2007 |

OTHER PUBLICATIONS

U.S. Office Action dated Jan. 15, 2014 from U.S. Appl. No. 12/450,527.
Jul. 11, 2014 Office Action issued in U.S. Appl. No. 12/450,527.
Chinese Office Action issued in Chinese Application No. 200880011069.7 dated Nov. 2, 2011 (with translation).
European Search Report dated Dec. 19, 2011 issued in European Application No. 08 73 9680.0.
Notification of Reasons for Rejection dated Jun. 13, 2012 from Japanese Patent Application No. 2007-097125 (with translation).
Notification of Reasons for Rejection dated Oct. 30, 2013 from Japanese Patent Application No. 2013-021301.

* cited by examiner

Fig. 1A
Fig. 1B
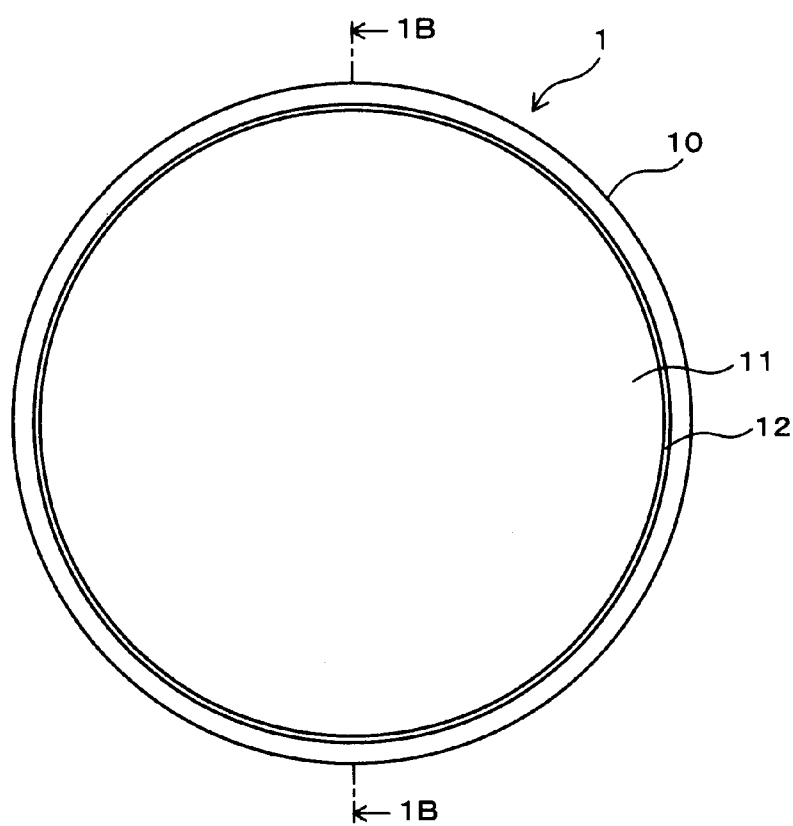
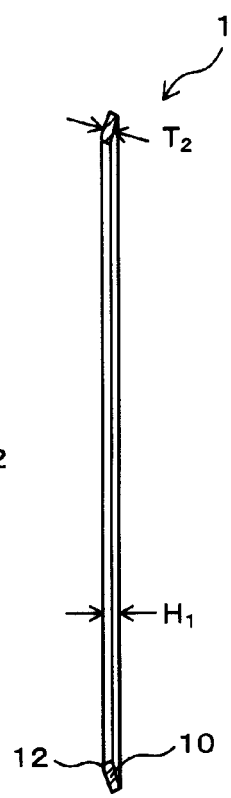

Fig. 2A
Fig. 2B
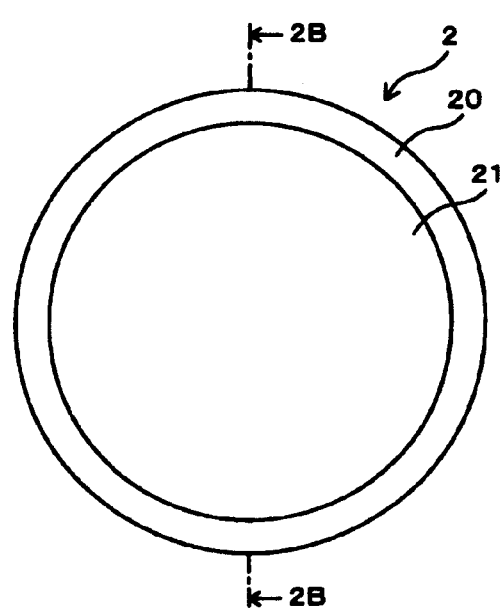
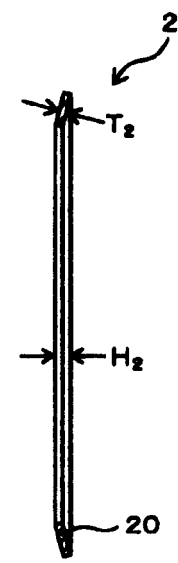
Fig. 3A
Fig. 3B
Prior Art
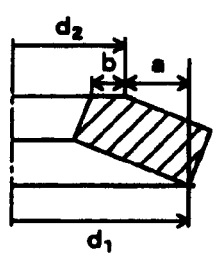
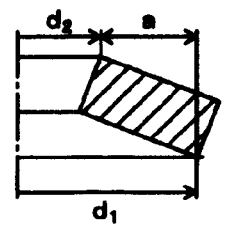

Fig. 6A
Fig. 6B
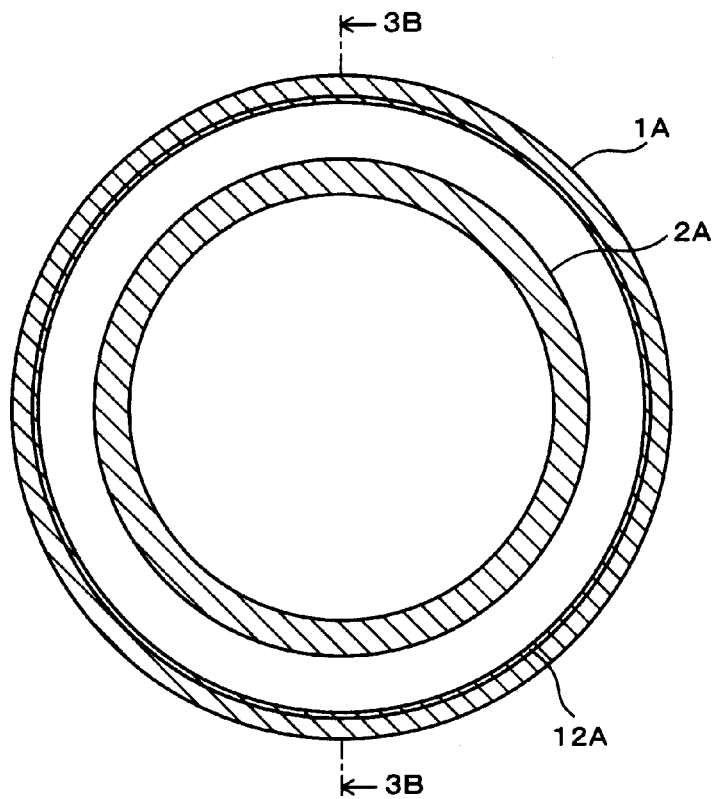
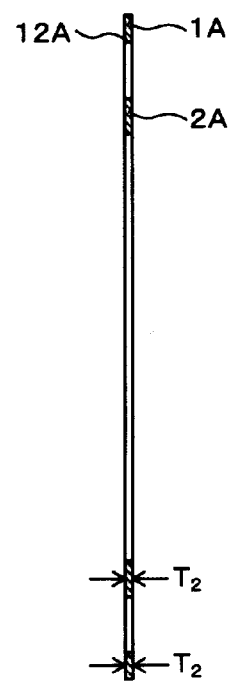

PRODUCTION METHOD FOR CONED DISC SPRING AND CLUTCH APPARATUS PROVIDED WITH CONED DISC SPRING

This application is a divisional application of U.S. patent application Ser. No. 12/450,527, filed Sep. 29, 2009, which is a national stage entry of PCT/JP2008/056569, filed Apr. 2, 2008, which claims priority to JP 2007-097125, filed Apr. 3, 2007, the disclosures of each of which are hereby incorporated by reference in their entirety.

TECHNICAL FIELD

The present invention relates to a production method for plural coned disc springs having outer diameters that are different from each other, and the present invention relates to a multiplate clutch apparatus provided with the coned disc springs. Specifically, the present invention relates to a technique for improving the production yield of the coned disc springs.

BACKGROUND ART

A clutch apparatus for a transporting machine comprises a wet-type multiplate clutch structure. The wet-type multiplate clutch structure comprises a cylindrical clutch drum having a bottom. In the clutch drum, driven plates and a piston are provided so as to be movable in the axial direction, and a ring-shaped coned disc spring is provided between the driven plate, which is proximate to a bottom surface of the clutch drum, and the piston (for example, see the following patent document 1). The coned disc spring is disposed such that an inner side surface thereof is supported by the piston and an outer side surface thereof is supported by the driven plate proximate to the bottom surface. The coned disc spring is elastically deformed from the dish shape into an approximately flattened shape, thereby absorbing shocks occurring during the engagement of the clutch of the clutch structure.

In such a coned disc spring, when the coned disc spring is deformed into an approximately flattened shape by elastic deformation, the displacement amount of the coned disc spring reaches the stroke length ST defined by the difference of the height H and the thickness T as shown in FIG. 10. At this time, a load is generated in the coned disc spring (hereinafter called "load in a flat condition"), and the load may be a design parameter for the clutch structure. The load in a flat condition depends on the outer diameter, the inner diameter, the thickness T, and the stroke length ST of a coned disc spring. The outer diameter, the inner diameter, and the stroke length ST of a coned disc spring are preselected as design parameters for a clutch structure. Therefore, the load in a flat condition is controlled by the thickness T.

The patent document 1 is Japanese Unexamined Patent Application Publication No. 9-032918.

Clutch apparatuses of automobiles having CVT (Continuously Variable Transmission) or AT (Automatic Transmission) may comprise plural clutch structures that have the same axis line and differ in size with respect to each other. Each clutch structure is provided with a coned disc spring having an outer diameter corresponding to the clutch drum thereof. In this case, since loads in flat conditions of the coned disc springs are not generally the same, the respective coned disc springs are made from materials having different thicknesses.

After a blank of a coned disc spring is punched from a sheet of material, the rest of the sheet of material cannot be used and may be scrapped. Therefore, large amounts of sheet of material are scrapped in the above-mentioned production of the coned disc spring. Accordingly, the material yield of the coned disc spring is low, thereby increasing the production cost.

DISCLOSURE OF THE INVENTION

An object of the present invention is to provide a production method for coned disc springs in which the production cost is decreased, and to provide a clutch apparatus that can be reduced in production cost by using the coned disc spring.

According to the first aspect of the present invention, the present invention provides a production method for coned disc springs, which comprises preparing a sheet of material, punching plural ring-shaped blanks from the sheet of material by press forming, and forming each of the blanks into a coned disc spring. The blanks comprise a primary blank that has a larger outer diameter and has an inner area and a secondary blank having a smaller outer diameter. The coned disc spring comprises a convex surface and a concave surface, the convex surface including an outer edge and an inner peripheral portion with an inner edge, the concave surface including an inner edge and an outer peripheral portion with an outer edge. The secondary blank is punched from the inner area of the primary blank in the press forming. At least one of the coned disc springs is formed with a flat portion or a tapered portion, the flat portion or the tapered portion being formed on at least one of the inner peripheral portion and the outer peripheral potion. The flat portion and the tapered portion extend from a portion between the inner edge and the outer edge to the inner edge in the convex surface, or extend from a portion between the inner edge and the outer edge to the outer edge in the concave surface.

A coned disc spring is formed with a flat portion or a tapered portion on at least one of the inner peripheral portion and the outer peripheral portion. Therefore, at least a portion between the inner edge and the outer edge of the concave surface or the convex surface can contact a clutch drum when a load is not applied. In this case, the difference between the contact diameters of the outer peripheral portion and the inner peripheral portion (that is, a distance between portions that contact a clutch drum) is small compared to that of a conventional coned disc spring without a flat portion or a tapered portion. In the coned disc spring formed with a flat portion or a tapered portion, the ratio of the height and the distance between the portions that contact a clutch drum is decreased. Therefore, a large load is generated when the coned disc spring is deformed into approximately flat shape (that is, when displacement amount of the coned disc spring reaches a stroke length defined by the difference between the height and the thickness) (hereinafter called "load in a flat condition"). In the production method for coned disc springs according to the first aspect of the present invention, a coned disc spring having a larger outer diameter and a coned disc spring having a smaller outer diameter are obtained from one sheet of material. In this case, the thickness of the sheet of material is selected so as to correspond to the thickness of a coned disc spring required to exhibit a smaller load in a flat condition. Moreover, a flat portion or a tapered portion is formed at a coned disc spring required to exhibit a larger load in a flat condition.

The reason for this will be described with reference to FIGS. 4A and 4B. FIGS. 4A and 4B are drawings showing a relationship of stroke length ST and load in flat condition P of each coned disc spring. FIG. 4A is a relationship drawing in a case in which a primary coned disc spring having a larger outer diameter has a thickness greater than that of a secondary coned disc spring having a smaller outer diameter. FIG. 4B is a relationship drawing in a case in which a secondary coned disc spring having a smaller outer diameter has a thickness greater than that of a primary coned disc spring having a larger outer diameter. The magnitude relationship of the stroke lengths $ST_1$ and $ST_2$ and the magnitude relationship of the loads in flat conditions $P_1$ and $P_2$ shown in FIGS. 4A and 4B are appropriately selected.

First, the case shown in FIG. 4A will be described. In this case, a coned disc spring having a larger outer diameter (hereinafter called a "primary coned disc spring") requires a stroke length $ST_1$ and a load in flat condition $P_1$ denoted by point A. A coned disc spring having a smaller outer diameter (hereinafter called a "secondary coned disc spring") requires a stroke length $ST_2$ and a load in flat condition $P_2$ denoted by point B. A primary coned disc spring satisfying the characteristics denoted by the point A is a primary coned disc spring which is not formed with a flat portion and has a thickness $T_1$. A secondary coned disc spring satisfying the characteristics denoted by the point B is a secondary coned disc spring which is not formed with a flat portion and has a thickness $T_2$ ($<T_1$).

In order to obtain the primary coned disc spring and the secondary coned disc spring from one sheet of material, the thickness of the primary coned disc spring is set to be $T_2$. As a result, since the thickness of the primary coned disc spring is small, the primary coned disc spring may exhibit a load in flat condition $P_3$ ($<P_1$) denoted by point C, and a primary coned disc spring which may exhibit the desirable load in flat condition $P_1$ cannot be obtained. However, in this case, a primary coned disc spring with a flat portion is formed by forming a flat portion on at least one of an inner peripheral portion and an outer peripheral portion, a load in a flat condition can be increased due to the flat portion as described above. Accordingly, even when a primary coned disc spring has the same thickness $T_2$ as that of a secondary coned disc spring having a smaller thickness, the primary coned disc spring may exhibit the desirable load in flat condition $P_1$ by forming a flat portion with an appropriate shape and size.

Next, the case shown in FIG. 4B will be described. In the case shown in FIG. 4B, a primary coned disc spring satisfying the characteristics denoted by the point A has a thickness smaller than that of a secondary coned disc spring (that is, $T_2>T_1$), which is different from the case shown in FIG. 4A.

In order to obtain a primary coned disc spring and a secondary coned disc spring from one sheet of material, the thickness of the secondary coned disc spring is set to be $T_1$. As a result, since the thickness of the secondary coned disc spring is small, the secondary coned disc spring may exhibit a load in flat condition $P_4$ ($<P_2$) denoted by point D. Therefore, a secondary coned disc spring that may exhibit the desirable load in flat condition $P_2$ cannot be obtained. However, in this case, a secondary coned disc spring with a flat portion is formed by forming a flat portion on at least one of an inner peripheral portion and an outer peripheral portion, a load in a flat condition can be increased due to the flat portion as described above. Accordingly, even when a secondary coned disc spring has the same thickness $T_1$ as that of a primary coned disc spring having a smaller thickness, the secondary coned disc spring may exhibit the desirable load in flat condition $P_2$ by forming a flat portion with an appropriate shape and size.

In the production method for coned disc springs according to the first aspect of the present invention, a flat portion with an appropriate shape and size is formed at a coned disc spring so as to increase a load in a flat condition. Therefore, plural coned disc springs in which each may exhibit a desirable load in a flat condition can be obtained from one sheet of material.

Moreover, a blank having a smaller outer diameter is punched from the inner area of a blank having a larger outer diameter, whereby a sheet of material as a raw material is efficiently used. Blanks of a coned disc spring having a larger outer diameter and a coned disc spring having a smaller outer diameter can be simultaneously punched out. As described above, the material yield of coned disc springs can be improved, and the number of the production steps can be reduced, whereby the production cost can be decreased.

As described in the example with reference to FIGS. 4A and 4B hereinbefore, a flat portion is formed so as to adjust a load that may be generated by coned disc springs. In the example, a tapered portion may be formed instead of the flat portion. In this case, an end portion of the tapered portion comes into contact with a counter member first when a load is applied, thereby obtaining effects similar to those of the flat portion.

According to the second aspect of the present invention, the present invention provides a production method for coned disc springs comprising preparing a sheet of material, punching plural ring-shaped blanks from the sheet of material by press forming, and forming each of the blanks into a coned disc spring. The blanks comprise a primary blank which has a larger outer diameter and has an inner area and comprise a secondary blank having a smaller outer diameter. The coned disc spring comprises an inner side surface and an outer side surface. The secondary blank is punched from the inner area of the primary blank in the press forming, and cutting is performed on at least one of the inner side surface and the outer side surface of at least one of the coned disc springs.

In a coned disc spring in which at least one of the inner side surface and the outer side surface is cut out, the side surface portions are cut out. Therefore, a load in a flat condition is small compared to that of a conventional coned disc spring in which the peripheral surface portion is not cut out. In the production method for coned disc springs according to the second aspect of the present invention, a coned disc spring having a larger outer diameter and a coned disc spring having a smaller outer diameter are obtained from one sheet of material. In this case, the thickness of the sheet of material is selected so as to correspond to the thickness of a coned disc spring required to exhibit a larger load in a flat condition. Moreover, a coned disc spring required to exhibit a smaller load in a flat condition is cut so as to form a cut portion.

The reason for this will be described with reference to FIGS. 5A and 5B. FIGS. 5A and 5B are drawings showing a relationship of stroke length ST and load in flat condition P of each coned disc spring. FIG. 5A is a relationship drawing in a case in which a primary coned disc spring having a larger outer diameter has a thickness greater than that of a secondary coned disc spring having a smaller outer diameter. FIG. 5B is a relationship drawing in a case in which a secondary coned disc spring having a smaller outer diameter has a thickness greater than that of a primary coned disc spring having a larger outer diameter. The magnitude relationship of the stroke lengths $ST_1$ and $ST_2$ and the magnitude relationship of the loads in flat conditions $P_1$ and $P_2$ shown in FIGS. 5A and 5B are appropriately selected.

First, the case shown in FIG. 5A will be described. In this case, a coned disc spring having a larger outer diameter (hereinafter called a "primary coned disc spring") requires a stroke length $ST_1$ and a load in flat condition $P_1$ denoted by point A. A coned disc spring having a smaller outer diameter (hereinafter called a "secondary coned disc spring") requires a stroke length $ST_2$ and a load in flat condition $P_2$ denoted by point B. A primary coned disc spring satisfying the characteristics denoted by the point A is a primary coned disc spring having a thickness $T_1$. A secondary coned disc spring satisfying the characteristics denoted by the point B is a secondary coned disc spring which is not formed with a cut portion and has a thickness $T_2$ ($<T_1$).

In order to obtain the primary coned disc spring and the secondary coned disc spring from one sheet of material, the thickness of the secondary coned disc spring is set to be $T_1$. As a result, since the thickness of the secondary coned disc spring is large, the secondary coned disc spring may exhibit a load in flat condition $P_5$ ($>P_2$) denoted by point E, and a secondary coned disc spring that may exhibit the desirable load in flat condition $P_2$ cannot be obtained. However, in this case, a secondary coned disc spring with a cut portion is formed by forming a cut portion on at least one of an outer side surface and an inner side surface, and a load in a flat condition can be decreased due to the cut portion as described above. Accordingly, even when a secondary coned disc spring has the same thickness $T_1$ as that of a primary coned disc spring having a larger thickness, the secondary coned disc spring may exhibit the desirable load in flat condition $P_2$ by forming a cut portion with an appropriate shape and size.

Next, the case shown in FIG. 5B will be described. In the case shown in FIG. 5B, a primary coned disc spring satisfying the characteristics denoted by the point A has a thickness smaller than that of a secondary coned disc spring (that is, $T_2>T_1$), which is different from the case shown in FIG. 5A.

In order to obtain a primary coned disc spring and a secondary coned disc spring from one sheet of material, the thickness of the primary coned disc spring is set to be $T_2$. As a result, since the thickness of the primary coned disc spring is large, the primary coned disc spring may exhibit a load in flat condition $P_6$ ($>P_1$) denoted by point F. Therefore, a primary coned disc spring that may exhibit the desirable load in flat condition $P_1$ cannot be obtained. However, in this case, a primary coned disc spring with a cut portion is formed by forming a cut portion on at least one of an outer side surface and an inner side surface, a load in a flat condition can be decreased due to the cut portion, as described above. Accordingly, even when a primary coned disc spring has the same thickness $T_2$ as that of a secondary coned disc spring having a larger thickness, the primary coned disc spring may exhibit the desirable load in flat condition $P_1$ by forming a cut portion with an appropriate shape and size.

The production method for coned disc springs according to the second aspect of the present invention is the same as the production method for coned disc springs according to the first aspect of the present invention, except for the following. Instead of a flat portion, a cut portion with an appropriate shape and size is formed at a coned disc spring so as to decrease a load in a flat condition. The production method for coned disc springs according to the second aspect of the present invention has the same effects as those of the production method for coned disc springs according to the first aspect of the present invention.

In a coned disc spring formed with a flat portion or a tapered portion by the production method according to the first aspect of the present invention, a load in a flat condition can be adjusted in a larger range, compared to a coned disc spring formed with a cut portion by the production method according to the second aspect of the present invention. Therefore, the production method according to the first aspect of the present invention is superior to the production method according to the second aspect of the present invention in adjustment of a load in a flat condition. In the production method according to the first aspect of the present invention, flat portions or tapered portions cannot be formed at plural blanks at a time. On the other hand, in the production method according to the second aspect of the present invention, plural blanks can be piled up and be simultaneously cut out by a lathe, for example. Moreover, in the production method according to the first aspect of the present invention, a coned disc spring can be produced without changing the inner diameter and the outer diameter while forming a flat portion or a tapered portion. In the production method according to the second aspect of the present invention, a coned disc spring can be produced without changing the height while forming a cut portion.

According to the third aspect of the present invention, the present invention provides a first clutch apparatus comprising plural clutch structures having the same axis lines. Each of the clutch structures comprises a cylindrical first member, a second member and a third member provided in the first member so as to be movable in an axial direction, and a ring-shaped coned disc spring provided between the second member and the third member. The coned disc spring comprises a convex surface and a concave surface, the convex surface including an outer edge and an inner peripheral portion with an inner edge, the concave surface including an inner edge and an outer peripheral portion with an outer edge. The coned disc springs in the plural clutch structures have the same thicknesses and have outer diameters that are different from each other, and at least one of the coned disc springs is formed with a flat portion or a tapered portion. The flat portion or the tapered portion is formed on at least one of the inner peripheral portion and the outer peripheral potion. The flat portion and the tapered portion extend from a portion between the inner edge and the outer edge to the inner edge in the convex surface, or extend from a portion between the inner edge and the outer edge to the outer edge in the concave surface.

In a first clutch apparatus, a flat portion or a tapered portion is formed on at least one of the coned disc springs having the same thickness, and the flat portion or the tapered portion is formed on at least one of the inner peripheral portion and outer peripheral portion. Therefore, by appropriately selecting the shape and the size of the flat portion or the tapered portion, plural coned disc springs that may exhibit different desirable loads in flat conditions can be obtained from one sheet of material. Accordingly, the material yield of coned disc springs can be improved, and the coned disc spring can be less expensive. As a result, an apparatus can be produced at lower cost.

According to the fourth aspect of the present invention, the present invention provides a second clutch apparatus comprising plural clutch structures having the same axis lines. Each of the clutch structures comprises a cylindrical first member, a second member and a third member provided in the first member so as to be movable in an axial direction, and a ring-shaped coned disc spring provided between the second member and the third member. The coned disc spring comprises an inner side surface and an outer side surface. The coned disc springs in the plural clutch structures have the same thicknesses and have outer diameters that are different from each other, and a cut portion is formed on at least one of the inner side surface and the outer side surface of at least one of the coned disc springs.

The second clutch apparatus of the present invention is the same as the first clutch apparatus of the present invention, except that, instead of a flat portion, a cut portion is formed on at least one of an inner side surface and an outer side surface of at least one of the coned disc springs having the same thickness. The second clutch apparatus of the present invention having the same effects as those of the first clutch apparatus of the present invention can thereby be obtained.

The clutch apparatuses of the present invention may have various structures. For example, a coned disc spring having a smaller outer diameter may have a size so as to be disposed inside of ring shape of a coned disc spring having a larger outer diameter. In this case, a blank having a smaller outer diameter is punched from the inner area of a blank having a larger outer diameter in press forming for producing coned disc springs, whereby the number of the production steps can be reduced. Therefore, a coned disc spring can be less expensive, and an apparatus may thereby be produced at lower cost.

Effects of the Invention

In the production method for coned disc springs according to the first aspect of the present invention, a flat portion or a tapered portion with an appropriate shape and size is formed on at least one of the coned disc springs so as to increase a load in a flat condition. Therefore, plural coned disc springs that may exhibit different desirable loads in flat conditions can be obtained from one sheet of material. According to the first clutch apparatus of the present invention, coned disc springs that may exhibit different desirable loads in flat conditions can be less expensive, whereby the apparatus can be produced at lower cost.

In the production method for coned disc springs according to the second aspect of the present invention, a cut portion with an appropriate shape and size is formed on at least one of coned disc springs so as to decrease a load in a flat condition. Therefore, plural coned disc springs that may exhibit different desirable loads in flat conditions can be obtained from one sheet of material. According to the second clutch apparatus of the present invention, coned disc springs that may exhibit different desirable loads in flat conditions can be less expensive, whereby the apparatus can be produced at lower cost.

BRIEF DESCRIPTION OF THE DRAWINGS

FIGS. 1A and 1B show a structure of a primary coned disc spring relating to the first embodiment of the present invention. FIG. 1A is a top view, and FIG. 1B is a sectional side view taken along line 1B-1B of FIG. 1A.

FIGS. 2A and 2B show a structure of a secondary coned disc spring relating to the second embodiment of the present invention. FIG. 2A is a top view, and FIG. 2B is a sectional side view taken along line 2B-2B of FIG. 2A.

FIG. 3A shows an example of a structure of a coned disc spring of the present invention and shows a cross section of the coned disc spring formed with a flat portion on an inner peripheral portion of a convex surface. FIG. 3B is a cross section showing a structure of a conventional coned disc spring.

FIG. 4A shows a relationship drawing in a case in which a primary coned disc spring having a larger outer diameter has a thickness greater than that of a secondary coned disc spring having a smaller outer diameter. FIG. 4B shows a relationship drawing in a case in which a secondary coned disc spring having a smaller outer diameter has a thickness greater than that of a primary coned disc spring having a larger outer diameter.

FIG. 5A shows a relationship drawing in a case in which a primary coned disc spring having a larger outer diameter has a thickness greater than that of a secondary coned disc spring having a smaller outer diameter. FIG. 5B shows a relationship drawing in a case in which a secondary coned disc spring having a smaller outer diameter has a thickness greater than that of a primary coned disc spring having a larger outer diameter.

FIGS. 6A and 6B are drawings showing structures of blanks of a primary coned disc spring and a secondary coned disc spring in FIGS. 1A to 2B. FIG. 6A shows a cross section, and FIG. 6B shows a sectional side view taken along line 3B-3B of FIG. 6A.

FIG. 8A shows a cross section of a secondary coned disc spring formed with a cut portion on an inner side surface. FIG. 8B shows a cross section of a secondary coned disc spring formed with a cut portion on an outer side surface.

FIG. 9A shows a cross section of a primary coned disc spring formed with a flat portion on an outer peripheral portion. FIG. 9B shows a cross section of a primary coned disc spring formed with a tapered portion on an inner peripheral portion.

Figure 4A:
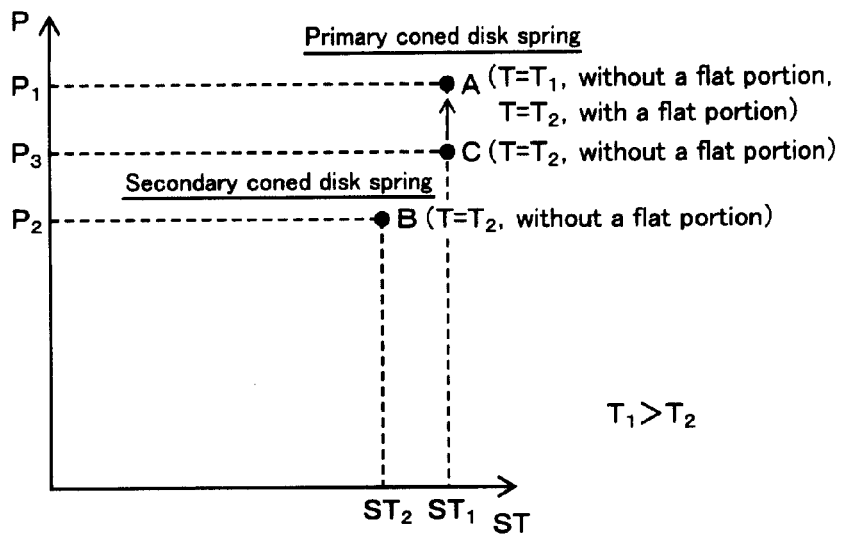
FIGS. 4A and 4B are drawings showing a relationship of a stroke length ST and a load in flat condition P of each coned disc spring formed by a production method according to the first aspect of the present invention.
Figure 4B:
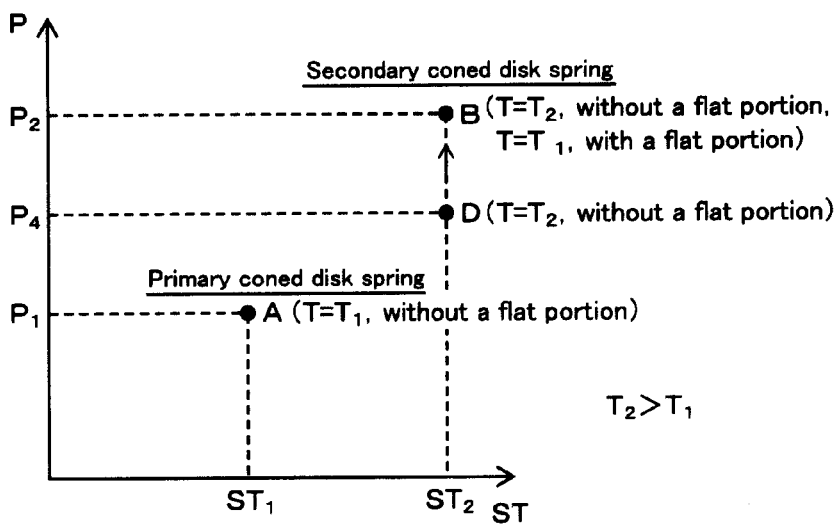

EXPLANATION OF REFERENCE NUMERALS 1, 5, and 6 denote a primary coned disc spring (coned disc spring having a larger outer diameter). 2, 3, and 4 denote a secondary coned disc spring (coned disc spring having a smaller outer diameter). 12 and 13 denote a flat portion. 14 denotes a tapered portion. 22 and 23 denote a cut portion. 30 denotes a clutch apparatus. 100 and 200 denote a clutch structure. 101 and 201 denote a cylindrical clutch drum (first member). 103 and 203 denote a driven plate (second member). 105 and 205 denote a piston (third member).

Best Mode For Carrying Out The Invention (1) First Embodiment
(1-1) Structure of Coned Disc Spring A first embodiment of the present invention will be described with reference to the figures hereinafter. FIGS. 1A to 2B are drawings showing structures of a primary coned disc spring (coned disc spring having a larger outer diameter, a primary coned disc spring with a flat portion) 1 and a secondary coned disc spring (coned disc spring having a smaller outer diameter) 2 relating to the first embodiment of the present invention. FIG. 1A shows a top view, FIG. 1B shows a sectional side view taken along line 1B-1B of FIG. 1A, FIG. 2A shows a top view, and FIG. 2B shows a sectional side view taken along line 2B-2B of FIG. 2A.

The primary coned disc spring 1 comprises a ring dish-shaped body 10 and a circular hole 11 at the center portion of the body 10. The primary coned disc spring 1 is formed with a flat portion 12 on an inner peripheral portion of a convex surface, and the flat portion 12 can come into contact with a counter member first when a load is applied. The secondary coned disc spring 2 comprises a ring dish-shaped body 20 and a circular hole 21 at the center portion of the body 20. The primary coned disc spring 1 and the secondary coned disc spring 2 have the same thickness of $T_2$.

As shown in FIG. 3A, the flat portion 12 of the primary coned disc spring 1 extends from a portion between the inner peripheral portion and the outer peripheral portion to the edge of the inner peripheral portion, and the flat portion 12 has a radial length of b. In the primary coned disc spring 1 formed with the flat portion 12 in FIG. 3A, the entire surface of the flat portion 12 can come into contact with a counter member first when a load is applied. Therefore, the difference "a" ($=d_1-d_2$) between a contact diameter $d_1$ of the outer peripheral portion and a contact diameter $d_2$ of the inner peripheral portion is small, compared to that of the conventional coned disc spring 101 without a flat portion in FIG. 3B. The contact diameters $d_1$ and $d_2$ are defined when the primary coned disc spring contacts the counter member. Accordingly, the primary coned disc spring 1 shown in FIG. 3A exhibits a greater load in a flat condition, compared to the conventional primary coned disc spring shown in FIG. 3B. It should be noted that the primary coned disc spring 1 shown in FIG. 3A has the thickness, the outer diameter, and the inner diameter, which are the same as those of the conventional primary coned disc spring 101 shown in FIG. 3B.

In the first embodiment, as denoted by the point A in FIG. 4A, the stroke length and a load in a flat condition of the primary coned disc spring 1 are $ST_1$ and $P_1$, respectively, which are the same as those of a primary coned disc spring having the thickness of $T_1$ that is larger than $T_2$. The stroke length and a load in a flat condition of the secondary coned disc spring 2 are $ST_2$ and $P_2$, respectively, as denoted by the point B in FIG. 4A.

The inner diameter of the primary coned disc spring 1 is set to be larger than the outer diameter of the secondary coned disc spring 2, and the secondary coned disc spring 2 has a size so as to be disposed inside the primary coned disc spring 1. The heights of the primary coned disc spring 1 and the secondary coned disc spring 2 are $H_1$ and $H_2$, respectively.

1-2 Production Method for Coned Disc Springs

A production method for the primary coned disc spring 1 and the secondary coned disc spring 2 will be described with reference mainly to FIGS. 6A and 6B. FIGS. 6A and 6B are drawings showing structures of a blank 1A of the primary coned disc spring 1 and a blank 2A of the secondary coned disc spring 2. FIG. 6A is a cross section, and FIG. 6B is a sectional side view taken along line 3B-3B of FIG. 6A. First, by press forming, a ring-shaped larger diameter blank 1A is punched from a sheet of material with the thickness $T_2$, and a ring-shaped smaller diameter blank 2A is punched from the inner area of the blank 1A. In this case, the larger diameter blank 1A is formed with a flat portion 12A on the inner peripheral portion, in view of the shape thereof after the following bending forming is performed.

The blanks 1A and 2A are bent at room temperature. Then, the dish-shaped blanks 1A and 2A are quenched, whereby a primary coned disc spring 1 is obtained from the dish-shaped blank 1A, and a secondary coned disc spring 2 is obtained from the dish-shaped blank 2A. The blank 1A is bent so that the flat portion 12A is disposed on the convex surface. In this case, the blanks 1A and 2A may be bent and be quenched at the same time. The flat portion 12 may be formed by forging press or press quenching during bending forming. In addition, the flat portion 12 may be formed by cutting or grinding in one of the steps of a step after the blank is formed, a step after a bending forming, and a step after quenching.

1-3 Structure of Clutch Apparatus

Figure 7:
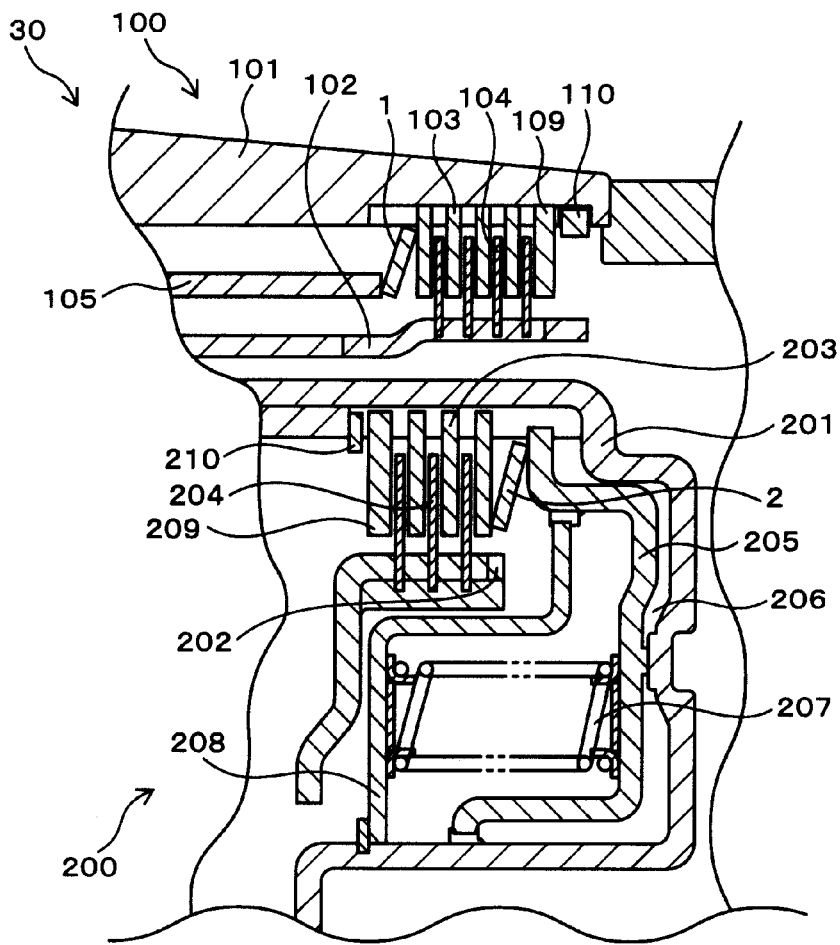
FIG. 7 is a sectional side view showing a structure of a multiplate clutch apparatus having a primary coned disc spring and a secondary coned disc spring in FIGS. 1A to 2B.

The above coned disc springs 1 and 2 can be used in a clutch apparatus 30 as shown in FIG. 7. FIG. 7 is a sectional side view showing a structure of the clutch apparatus 30. The clutch apparatus 30 may be used for a CVT vehicle of an automobile, for example, and comprises a wet multiplate reverse clutch structure 100 and a wet multiplate forward clutch structure 200. The forward clutch structure 200 is provided in an approximately cylindrical cavity portion, which is formed inside the reverse clutch structure 100, and has the same rotational axis as the reverse clutch structure 100.

The reverse clutch structure 100 comprises a cylindrical clutch drum 101 having a bottom, and plural spline grooves extending to the axial direction are formed at an inner peripheral surface of the clutch drum 101 in the circumferential direction at equal intervals. A cylindrical clutch hub 102 is provided inside the clutch drum 101 so as to have the same rotational axis as the clutch drum 101. Plural spline grooves extending to the axial direction are formed at an outer peripheral surface of the clutch hub 102 in the circumferential direction at equal intervals.

Driven plates 103 and driving plates 104 are provided between the clutch drum 101 and the clutch hub 102. The driven plates 103 are fitted into the spline grooves of the clutch drum 101, and the driving plates 104 are fitted into the spline grooves of the clutch hub 102. The driven plates 103 and the driving plates 104 are disposed alternately at predetermined intervals and are movable in the axial direction. A piston 105 is disposed on a side of a bottom surface (left side in FIG. 7) of the clutch drum 101 so as to be movable in the axial direction. An oil pressure chamber (not shown in the figure) to which hydraulic oil is supplied is formed between the clutch drum 101 and the piston 105. An end portion of a return spring (not shown in the figure) is secured at an opening side surface of the piston 105. The return spring extends or contracts by pressure applied to the piston 105, and the return spring biases the piston 105 toward the side of the bottom surface of the clutch drum 101.

The above primary coned disk spring 1 is disposed between the driven plate 103 and the piston 105, the driven plate 103 being proximate to the bottom surface of the clutch drum 101. In this case, the primary coned disk spring 1 is disposed such that an inner circumferential edge portion of the body 10 is supported by the piston 105, and an outer peripheral portion of the body 10 is supported by the driven plate 103. Thus, the primary coned disk spring 1 is movable in the axial direction. A retaining plate 109 for supporting the driven plate 103 and the driving plate 104 is disposed proximate to the opening of the clutch drum 101. A snap ring 110 for preventing the retaining plate 109 from separating to the outside is disposed at the opening side surface proximate to the retaining plate 109.

The forward clutch structure 200 is equipped with a cylindrical clutch drum 201 having a bottom. The clutch drum 201 is provided in an approximately cylindrical cavity portion formed inside the clutch hub 102 of the reverse clutch structure 100. Plural spline grooves extending to the axial direction are formed at an inner peripheral surface of the clutch drum 201 in the circumferential direction at equal intervals. A cylindrical clutch hub 202 is provided inside the clutch drum 201 so as to have the same rotational axis as the clutch drum 201. Plural spline grooves extending to the axial direction are formed at an outer peripheral surface of the clutch hub 202 in the circumferential direction at equal intervals.

Driven plates 203 and driving plates 204 are provided between the clutch drum 201 and the clutch hub 202. The driven plates 203 are fitted into the spline grooves of the clutch drum 201, and the driving plates 204 are fitted into the spline grooves of the clutch hub 202. The driven plates 203 and the driving plates 204 are disposed alternately at predetermined intervals and are movable in the axial direction. A piston 205 is disposed on a side of a bottom surface of the clutch drum 201 so as to be movable in the axial direction. An oil pressure chamber 206, to which hydraulic oil is supplied, is formed between the clutch drum 201 and the piston 205. An end portion of return spring 207 is secured at an opening side surface of the piston 205. The other end portion of the return spring 207 is secured on a spring retainer 208 provided on the clutch drum 201. The return spring 207 extends or contracts by pressure applied to the piston 205, and the return spring 207 biases the piston 205 toward the bottom surface of the clutch drum 201.

The above secondary coned disk spring 2 is disposed between the driven plate 203 and the piston 105, the driven plate 203 being proximate to the bottom surface of the clutch drum 201. In this case, the secondary coned disk spring 2 is disposed such that an inner peripheral portion of the body 20 is supported by the driven plate 203, and an outer peripheral portion of the body 20 is supported by the piston 205. Thus, the secondary coned disk spring 2 is movable in the axial direction. A retaining plate 209 for supporting the driven plate 203 and the driving plate 204 is disposed proximate to an opening of the clutch drum 201. A snap ring 210 for preventing the retaining plate 209 from separating to the outside is disposed at an opening side surface of the retaining plate 209.

(4) Operation of Clutch Structure

Operations of the clutch structures 100 and 200 using the coned disk springs 1 and 2 will be described with reference mainly to FIG. 7. The reverse clutch structure 100 is used in reverse driving of a CVT vehicle, and the forward clutch structure 200 is used in forward driving of a CVT vehicle. Since the clutch structures 100 and 200 function in each driving in the same manner, a description of the operation of the reverse clutch structure 100 will be given hereinafter, and a description of the operation of the forward clutch structure 200 will be omitted.

When hydraulic oil is supplied to the oil pressure chamber, the piston 105 is driven by oil pressure, thereby resisting a biasing force of the return spring and moving toward the opening of the clutch drum 101 in the axial direction. The piston 105 presses the driven plate 103 via the primary coned disk spring 1, the driven plate 103 being proximate to the bottom surface of the clutch drum 101. Thus, the driven plates 103, the driving plates 104, and the retaining plate 109 move toward the opening of the clutch drum 101 in the axial direction, the driven plates 103 and the driving plates 104 being disposed alternately. The retaining plate 209 is pressed onto the snap ring 110 by this movement, so that frictional surfaces of the driven plates 103 and the driving plates 104, which face each other, engage with each other. Therefore, the engaging action of the clutch structure 100 is performed, so that torque transmission can be performed between the clutch drum 101 and the clutch hub 102. In this case, the primary coned disk spring 1 is elastically deformed from the dish shape into an approximately flattened shape, thereby absorbing shocks occurring in the engaging action of the clutch structure 100. In this case, as denoted by the point A in FIG. 4A, the load in a flat condition of the primary coned disk spring 1 is $P_1$.

Next, the hydraulic oil is discharged from the oil pressure chamber, so that the piston 105 is pressed and returns toward the bottom surface of the clutch drum 101 by the biasing force of the return spring. Thus, the engagement of the frictional surfaces of the driven plates 103 and the driving plates 104 is released, the engaging action of the clutch structure is released, and the shape of the primary coned disk spring 1 returns to the initial shape thereof.

As described above, in the production method for coned disc springs of the first embodiment, a flat portion 12 with an appropriate shape and size is formed at the coned disc spring 1 so as to increase the load in a flat condition. Therefore, plural coned disc springs 1 and 2, which may exhibit different desirable loads in flat conditions, can be obtained from one sheet of material. A blank 2A having a smaller outer diameter is punched from the inner area of a blank 1A having a larger outer diameter, whereby a sheet of material as a raw material can be efficiently used. Moreover, the coned disc spring 1 having a larger outer diameter and the coned disc spring 2 having a smaller outer diameter are simultaneously punched out. As described above, the material yield of the coned disc springs 1 and 2 can be improved, and the number of the production steps can be reduced, whereby the production cost can be decreased.

In the clutch apparatus 30 of the first embodiment, a flat portion 12 is formed on at least one of inner peripheral portions of the convex surfaces and outer peripheral portions of the concave surfaces of the coned disc springs 1 and 2 that have the same thickness. Therefore, by appropriately selecting the shape and the size of the flat portions, plural coned disc springs 1 and 2, which may exhibit different desirable loads in flat conditions, can be obtained from one sheet of material. Accordingly, the material yield of the coned disc springs 1 and 2 can be improved, whereby the coned disc springs 1 and 2 can be less expensive. As a result, the apparatus 30 can be less expensive.

Specifically, the blank 2A having a smaller outer diameter is punched from the inner area of the blank 1A having a larger outer diameter in press forming when the coned disc springs 1 and 2 are produced, thereby reducing the number of the production steps. Therefore, the coned disc springs 1 and 2 can be less expensive, and the apparatus 30 can be less expensive.

(2) Second Embodiment

Figure 8A:
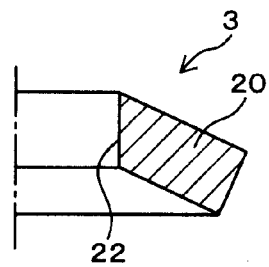
FIGS. 8A and 8B show a part of a structure of a secondary coned disc spring relating to the second embodiment of the present invention.
Figure 8B:
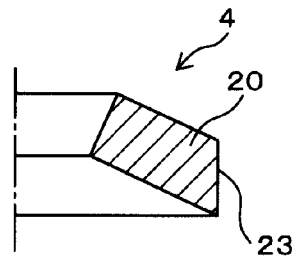

In the Second Embodiment, a larger thickness $T_1$ is selected as the thicknesses of a primary coned disc spring and a secondary coned disc spring, instead of selecting a smaller thickness $T_2$ as the First Embodiment. According to this, instead of forming a flat portion on a primary coned disc spring as the First Embodiment, a cut portion is formed at the secondary coned disc spring so as to decrease the load in a flat condition thereof. FIGS. 8A and 8B show parts of structures of secondary coned disc springs 3 and 4 relating to the second embodiment of the present invention. FIG. 8A shows a cross section of the secondary coned disc spring 3 formed with a cut portion 22 at an inner side surface, and FIG. 8B shows a cross section of the secondary coned disc spring 4 formed with a cut portion 23 at an outer side surface. In the Second Embodiment, structural components similar to those in the First Embodiment have the same reference numerals as in the First Embodiment, and the descriptions of the structural components having similar effects as those in the First Embodiment will be omitted.

The primary coned disc spring (coned disc spring having a larger outer diameter) in the Second Embodiment has a shape in cross section that is similar to that of the secondary coned disc spring 2 in the First Embodiment. The secondary coned disc spring (coned disc spring having a smaller outer diameter, coned disc spring with a cut portion) in the Second Embodiment may be exemplified by the secondary coned disc spring 3 or the secondary coned disc spring 4. The secondary coned disc spring 3 has an inner side surface formed with a cut portion 22 that is parallel to the axial direction as shown in FIG. 8A. The secondary coned disc spring 4 has an outer side surface formed with a cut portion 23 that is parallel to the axial direction as shown in FIG. 8B. Therefore, in the secondary coned disc springs 3 and 4, the peripheral portions thereof formed with a cut portion 22 or 23 are parallel to the axial direction, thereby preventing damage to a counter member when the secondary coned disc springs have a collision with the counter member in radial direction.

In the secondary coned disc springs 3 and 4 formed with a cut portion 22 or 23, respectively, as shown in FIGS. 8A and 8B, parts of the peripheral portions are cut out, whereby the loads in flat conditions are small compared to a conventional coned disc spring without a cut portion.

Figure 5A:
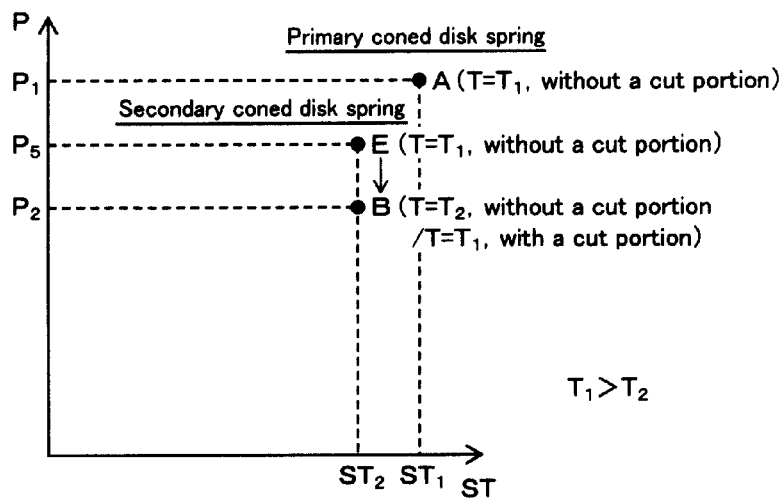
FIGS. 5A and 5B are drawings showing a relationship of a stroke length ST and a load in flat condition P of each coned disc spring formed by the production method according to the second aspect of the present invention.
Figure 5B:
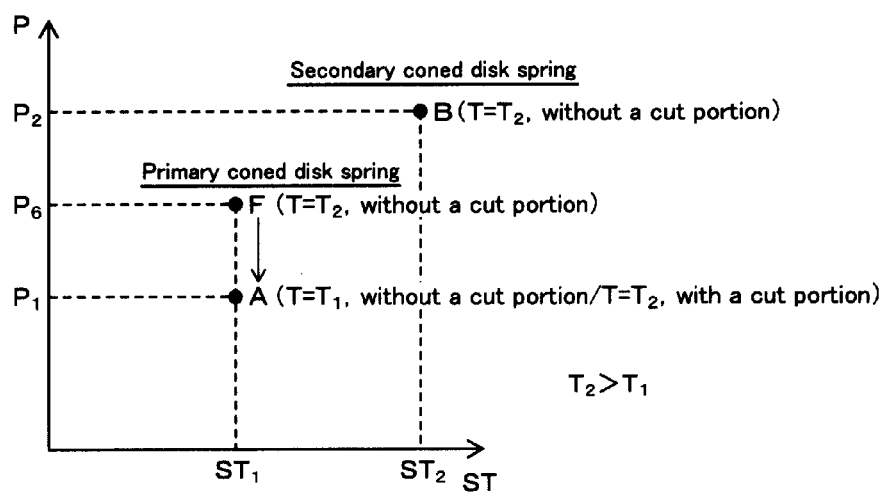

Accordingly, in the Second Embodiment, the stroke length and the load in a flat condition of the primary coned disc spring is $ST_1$ and $P_1$, respectively, as denoted by the point A in FIG. 5A. The stroke lengths and the loads in flat conditions of the secondary coned disc springs 3 and 4 are $ST_2$ and $P_2$, respectively, as denoted by the point B in FIG. 5A, which are the same as those of a primary coned disc spring having the thickness of $T_2$ that is smaller than $T_1$. Such primary coned disc spring and secondary coned disc spring can be used in the clutch apparatus 30, which is the same as the case of the First Embodiment.

In the production method for coned disc springs of the Second Embodiment, a ring-shaped larger diameter blank is punched from a sheet of material having a thickness of $T_1$ by press forming. Then, a ring-shaped smaller diameter blank is punched from the inner area of the larger diameter blank. After these two blanks are bent at room temperature, the two dish-shaped blanks are quenched. Thus, a primary coned disc spring is obtained from the dish-shaped larger diameter blank. The dish-shaped smaller diameter blanks are piled up and are cut at inner side surfaces or outer side surfaces by a lathe so as to obtain a secondary coned disc spring 3 or a secondary coned disc spring 4. In this case, the blank may be bent and be quenched at the same time.

As described above, the production method for the coned disc springs 3 and 4 of the Second Embodiment is the same as the production method for the coned disc springs 1 and 2 of the First Embodiment, except for the following. Instead of the flat portion 12, cut portions 22 and 23 with appropriate shapes and sizes are formed at the coned disc springs so as to decrease the loads in flat conditions. The production method for the coned disc springs 3 and 4 of the Second Embodiment has the same effects as those of the production method for the coned disc springs 1 and 2 of the First Embodiment. In the clutch apparatus 30 of the Second Embodiment, the structure is the same as that of the first clutch apparatus of the present invention, except for the following. Instead of the flat portion 12, a cut portion 22 or 23 is formed on at least one of the inner side surface and the outer side surface of at least one of the coned disc springs having the same thickness. Therefore, the clutch apparatus 30 of the Second Embodiment has the same effects as those of the first clutch apparatus of the present invention.

The production method for coned disc springs of the First Embodiment and the production method for coned disc springs of the Second Embodiment will now be compared. That is, the coned disc spring 1 formed with a flat portion 12 may exhibit a flat time deformation time load that can be adjusted in a wide range, compared to the coned disc springs 3 and 4 formed with a cut portion 22 or 23. Therefore, the production method for coned disc springs of the First Embodiment is superior to the production method for coned disc springs of the Second Embodiment in adjustment of the load in a flat condition. In the production method for coned disc springs of the First Embodiment, the flat portions 12A cannot be formed at plural blanks at a time. On the other hand, in the production method for coned disc springs of the Second Embodiment, plural blanks can be piled up and be simultaneously cut out by a lathe, for example. Moreover, in the production method for coned disc springs of the First Embodiment, a coned disc spring 1 can be produced without changing the inner diameter and the outer diameter while forming the flat portion 12. In the production method for coned disc springs of the Second Embodiment, coned disc springs 3 and 4 can be produced without changing the heights while forming a cut portion 22 or 23.

(3) Additional Examples

Figure 9A:
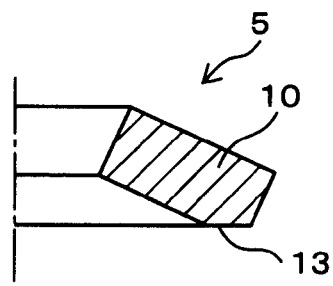
FIGS. 9A and 9B show a part of a structure of another example of a primary coned disc spring relating to the second embodiment of the present invention.

The present invention is described with reference to the above embodiments as described above, but the present invention is not limited to the above embodiments and can be modified in various ways. For example, a flat portion 12 is formed at an inner peripheral portion of a primary coned disc spring 1 in the First Embodiment. Instead of the flat portion 12, a flat portion 13 may be formed at an outer peripheral portion of a primary coned disc spring 5 as shown in FIG. 9A. In this case, the flat portion 13 on the concave surface extends from a portion between the inner peripheral portion and the outer peripheral portion to the edge of the outer peripheral portion. The entire surface of the flat portion 13 can come into contact with a counter member first when a load is applied. The primary coned disc spring may be formed with both a flat portion 12 and a flat portion 13.

Figure 9B:
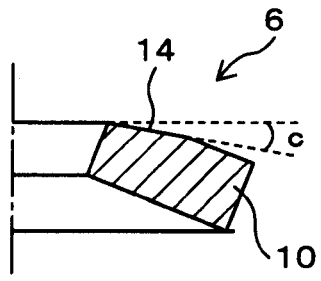
Figure 10:
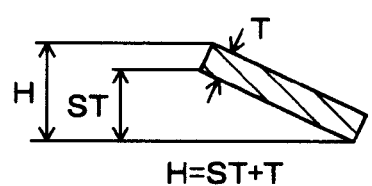
FIG. 10 shows a structure of a side of a coned disc spring and is a sectional side view showing a relationship of a stroke length ST, the thickness T, and the height T.

Moreover, for example, as shown in FIG. 9B, a tapered portion 14 may be formed at an inner peripheral portion of the primary coned disc spring 6. The tapered portion 14 on the convex surface is inclined from a portion between the inner peripheral portion and the outer peripheral portion to the edge of the inner peripheral portion at a slant angle of "c" toward the concave surface. An edge portion of the tapered portion 14 can come into contact with a counter member first when a load is applied. Such a tapered portion 14 may be formed at an outer peripheral portion, instead of the flat portion 13.

Furthermore, in the First Embodiment, a flat portion 12 is formed at the primary coned disc spring 1, and the flat portion may be formed on at least one of an inner peripheral portion and an outer peripheral portion of the secondary coned disc spring 2. In the Second Embodiment, a cut portion is formed at an inner side surface or an outer side surface of a secondary coned disc spring, and the cut portions may be formed at both of the inner side surface and the outer side surface of the secondary coned disc spring. In the Second Embodiment, a cut portion is formed at a secondary coned disc spring, and the cut portion may be formed on at least one of an inner side surface and an outer side surface of a primary coned disc spring.

Plural teeth may be formed at the outer side surfaces of the primary coned disk spring 1 and the secondary coned disk spring 2 so as to project toward an outer radial direction. The teeth of the primary coned disk spring 1 and the secondary coned disk spring 2 are fitted into spline grooves of the clutch drum 101 of the clutch structure 100 and the clutch drum 201 of the clutch structure 200, respectively. The teeth of the primary coned disk spring 1 and the secondary coned disk spring 2 prevent relative rotation with respect to the clutch drum 101 and 201.

Although the clutch apparatus 30 is equipped with the clutch structures 100 and 200 in the above embodiments, the present invention is not limited to this. For example, the clutch apparatus 30 is equipped with three or more clutch structures having the same axis lines. In this case, in coned disk springs used for the clutch structures, in the same manner as in the above embodiment, flat portions, tapered portions, or cut portions may be appropriately formed, and the coned disk springs may be obtained from one sheet of material having the same thickness as that of the coned disc springs. Thus, each coned disc spring is adjusted so as to exhibit a load in a flat condition corresponding to each clutch structure. Although the present invention is used for the multiplate clutch apparatus of a CVT vehicle of automobile in the above embodiments, the present invention is not limited to this. For example, the present invention can be used for multiplate clutch apparatuses of transporting machines such as AT vehicles of automobiles, construction machines, and motorcycles.

Although the primary coned disk spring 1 and the secondary coned disk spring 2 obtained from one sheet of material are used for the clutch apparatus 30 in the above embodiments, the present invention is not limited to this. For example, the primary coned disk spring and the secondary coned disk spring can be respectively used for clutch apparatuses that are different from each other. In the above embodiments, loads in flat conditions are used as loads of the primary coned disk spring and the secondary coned disc spring in the clutch structures 100 and 200, the loads in flat conditions being generated when the primary coned disk spring and the secondary coned disk spring are deformed into an approximately flattened shape. The present invention is not limited to this, and loads, which are generated at freely selected stroke lengths ST before the primary coned disk spring and the secondary coned disk spring are deformed into an approximately flattened shape, can be used.

The invention claimed is:

1. A clutch apparatus comprising:
   plural clutch structures having common axis lines; each of the clutch structures comprising a cylindrical first member, a second member and a third member provided in the first member so as to be movable in an axial direction, and a ring-shaped coned disc spring provided between the second member and the third member, the coned disc spring comprising a convex surface and a concave surface, the convex surface including an outer edge and an inner peripheral portion with an inner edge, the concave surface including an inner edge and an outer peripheral portion with an outer edge,
   wherein the coned disc springs in the plural clutch structures have the same thicknesses and have outer diameters that are different from each other, and at least one of the coned disc springs is formed with a flat portion or a tapered portion, the flat portion or the tapered portion being formed on at least one of the inner peripheral portion and the outer peripheral potion, the flat portion and the tapered portion extending from a portion between the inner edge and the outer edge to the inner edge in the convex surface, or extending from a portion between the inner edge and the outer edge to the outer edge in the concave surface;
   wherein the flat or tapered portion is provided only to the coned disc spring in which a required load in a flat condition is larger than a required load of the other coned disc spring; and wherein one of the coned disc springs comprises a primary coned disc spring having a larger outer diameter and the other coned disc spring comprises a secondary coned disc spring having a smaller outer diameter, the secondary coned disc spring having a size configured to be disposed inside of the primary coned disc spring.

* * * * *